United States Patent

Heil et al.

[11] Patent Number: 5,991,148
[45] Date of Patent: Nov. 23, 1999

[54] METAL-ENCLOSED GAS-INSULATED SWITCHGEAR ASSEMBLY

[75] Inventors: Franz Heil, Baden-Rütohof; Piero Tecchio, Oberrohrdorf, both of Switzerland

[73] Assignee: Asea Brown Boveri AG, Baden, Switzerland

[21] Appl. No.: 09/058,209

[22] Filed: Apr. 10, 1998

[30] Foreign Application Priority Data

Apr. 17, 1997 [DE] Germany .................. 197 16 024

[51] Int. Cl.$^6$ .................................................. H02B 5/00
[52] U.S. Cl. ..................... 361/605; 361/612; 361/618; 361/619; 218/75; 218/79; 218/80
[58] Field of Search .................................... 361/600, 602, 361/603, 604, 605, 611, 612, 618, 620; 218/75, 80, 79, 43–45; 307/112, 113

[56] References Cited

FOREIGN PATENT DOCUMENTS

| 0678954A1 | 10/1995 | European Pat. Off. . |
| 0744803A2 | 11/1996 | European Pat. Off. . |
| 2047502 | 4/1972 | Germany . |
| 4438776C1 | 4/1996 | Germany . |

OTHER PUBLICATIONS

"Die 550–kV–SF6–gasisolierte Schaltanlage Itaipu", Varga et al., Brown Boveri Technik 9, 1986, pp. 488–497.
Postes blindes isoles au SF6 type ELK, BBC Brown Boveri publication.

*Primary Examiner*—Leo P. Picard
*Assistant Examiner*—Boris L. Chervinsky
*Attorney, Agent, or Firm*—Burns, Doane, Swecker & Mathis, L.L.P.

[57] ABSTRACT

This metal-enclosed, gas-insulated switchgear assembly is provided with at least one multiphase switch panel which is mounted on a foundation surface (8), with in each case at least one power breaker (1, 2, 3) per phase which extends along a longitudinal axis (4, 5, 6), these longitudinal axes (4, 5, 6) being arranged in a first plane, with at least one busbar system which is arranged in at least a second plane and extends along busbar axes (13, 14, 15) and in which the busbar axes (13, 14, 15) have a distance (s) between them. The distance between centers between a first connecting stub (16, 17, 18) and a second connecting stub (25, 26, 27) of the power breaker (1, 2, 3) is at least three times and at most four times as great as the distance (s) between the busbar axes (13, 14, 15). The power breakers (1, 2, 3) may be arranged offset and aligned in a row, resulting in very compact switch panels.

17 Claims, 17 Drawing Sheets

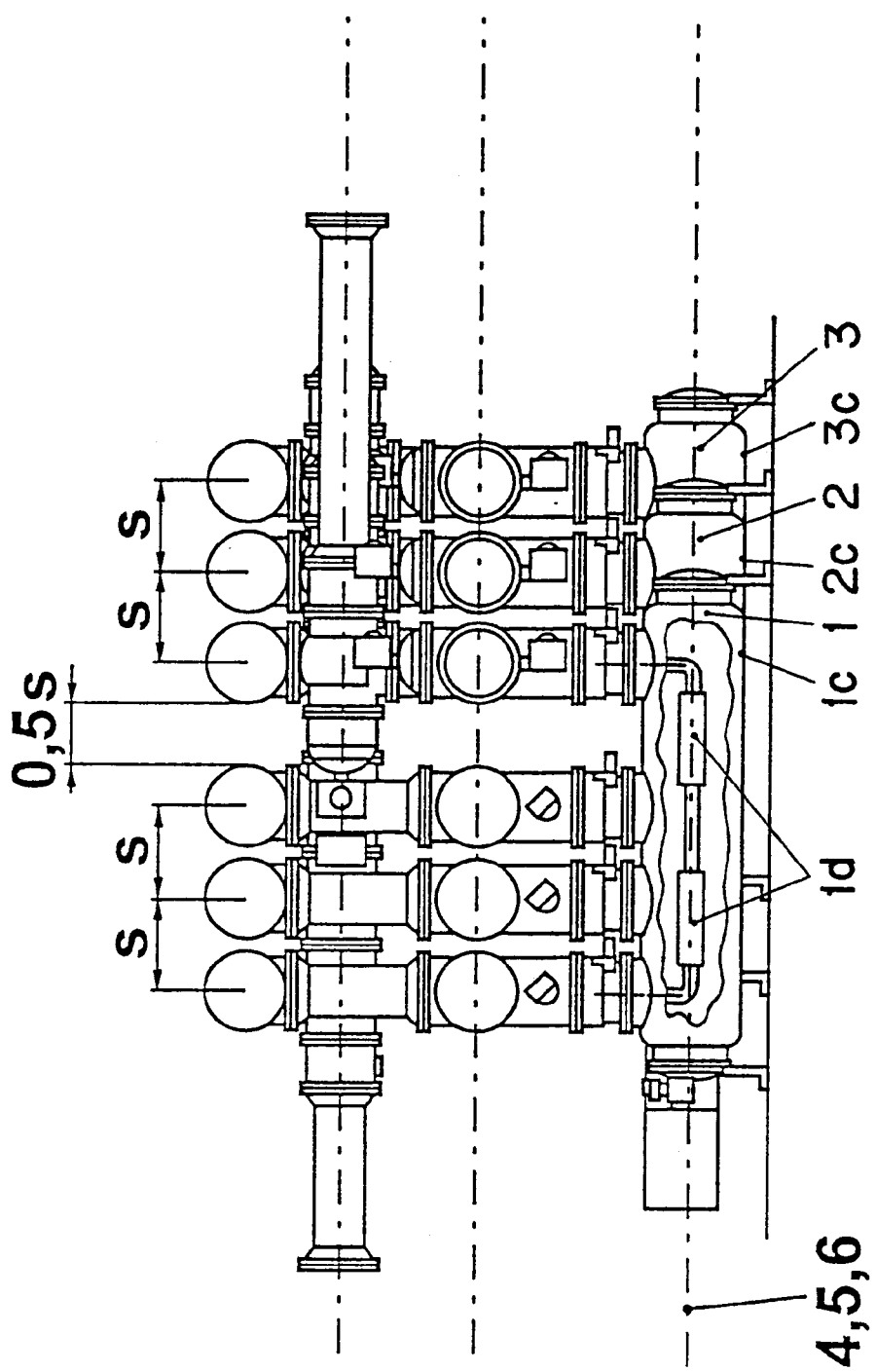

METAL-ENCLOSED GAS-INSULATED SWITCHGEAR ASSEMBLY

BACKGROUND OF THE INVENTION

1. Field of the Invention

The present invention relates to a metal-enclosed, gas-insulated switchgear assembly.

2. Discussion of Background

Document No. CH-A 161 312 F from the Company Brown, Boveri and Cie discloses single-phase metal-enclosed, gas-insulated switchgear assemblies which are constructed using one of the various standard switchgear assembly circuits. Standard switchgear assembly circuits include, for example, the single busbar arrangement, the single busbar with an auxiliary rail, the 1½-switch arrangement, the ring circuit, the double-switch arrangement, the various arrangements with double busbars, etc. A 1½-switch arrangement with busbars located at the top has been produced with power breakers arranged with a very large offset. This arrangement is illustrated in FIG. 54 of this document. The three horizontally arranged power breakers, one of which is required for each phase, are in this case arranged separately and at a comparatively long distance from the adjacent phase. The two busbar systems are located in a region above the power breaker terminals in a plane parallel to the foundation surface and have a large intermediate area which is unusable. Such a metal-enclosed gas-insulated switchgear assembly occupies a comparatively large amount of space and, in this configuration, is therefore suitable only to a limited extent for installation in a building. The busbars are arranged at a comparatively high level so that complex and long metal-enclosed connecting pieces have to be provided for the electrical connections between the busbars and the respectively associated power breakers.

Document Brown Boveri Technik 9-86, pages 488 to 497, FIG. 5 discloses a metal-enclosed, gas-insulated switchgear assembly which has power breakers that are arranged aligned horizontally alongside one another in a row, and has busbar systems that are located above the electrical terminals of the power breakers. These busbar systems are located in a region well above and partially outside the region bounded by the electrical terminals of the power breaker, which point vertically upwards, so that the latter cannot limit the space for these busbar systems and, therefore, this arrangement requires a comparatively large physical volume. Once again, complex metal-enclosed connecting pieces are required for the electrical connections between the busbars and the respectively associated power breakers.

Owing to the predetermined geometry, such metal-enclosed, gas-insulated switchgear assemblies require a comparatively large amount of space. The comparatively long connecting pieces to the busbars also increase the cost of the switchgear assembly.

SUMMARY OF THE INVENTION

Accordingly, one object of the invention as it is described in the independent claims is to provide a novel metal-enclosed gas-insulated switchgear assembly which is designed such that it requires a considerably smaller amount of space.

The advantages achieved by the invention may be regarded as being that the various connecting enclosures required for conventional gas-insulated switchgear assemblies are combined by the modular structure of the switchgear assembly. In particular, it is advantageous that the required physical height of the switchgear assembly is generally less than that of conventional switchgear assemblies. The metal-enclosed, gas-insulated switchgear assembly has a comparatively very compact construction, which is particularly advantageous with regard to earthquake protection. The three-phase transport units of this switchgear assembly can advantageously be designed to be small so that no special vehicles are required to transport them. The lack of these various connecting enclosures allows the apparatuses installed in the gas-insulated switchgear assembly to be packed more densely.

The power breakers can not only be offset by a module dimension M with respect to one another but can also be arranged aligned alongside one another in a row and, in addition, it is possible to remove and to fit the quenching chambers used in the power breaker both on the drive side and on the end of the power breaker tank facing away from the drive, for overhaul. It is therefore possible to provide control access for this switchgear assembly either on the drive side of the power breaker or on the side of the power breaker facing away from the drive. The metal-enclosed, gas-insulated switchgear assembly according to the invention therefore offers a wide range of circuit options, a wide range of refinement options and highly flexible installation options in buildings so that an optimum switchgear assembly in terms of price and space requirement is always available to meet the respective customer wishes.

The configuration having power breakers arranged offset by a module dimension M represents a particularly economic solution.

The invention, its development and the advantages which can be achieved using it are explained in more detail in the following text with reference to the drawing, which illustrates only one possible means of implementation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a shows a simplified side view of the 1½-switch arrangement according to FIG. 4.

Only those elements which are required for direct understanding of the invention are illustrated and described.

DESCRIPTION OF THE PREFERRED EMBODIMENTS

Figure 1:
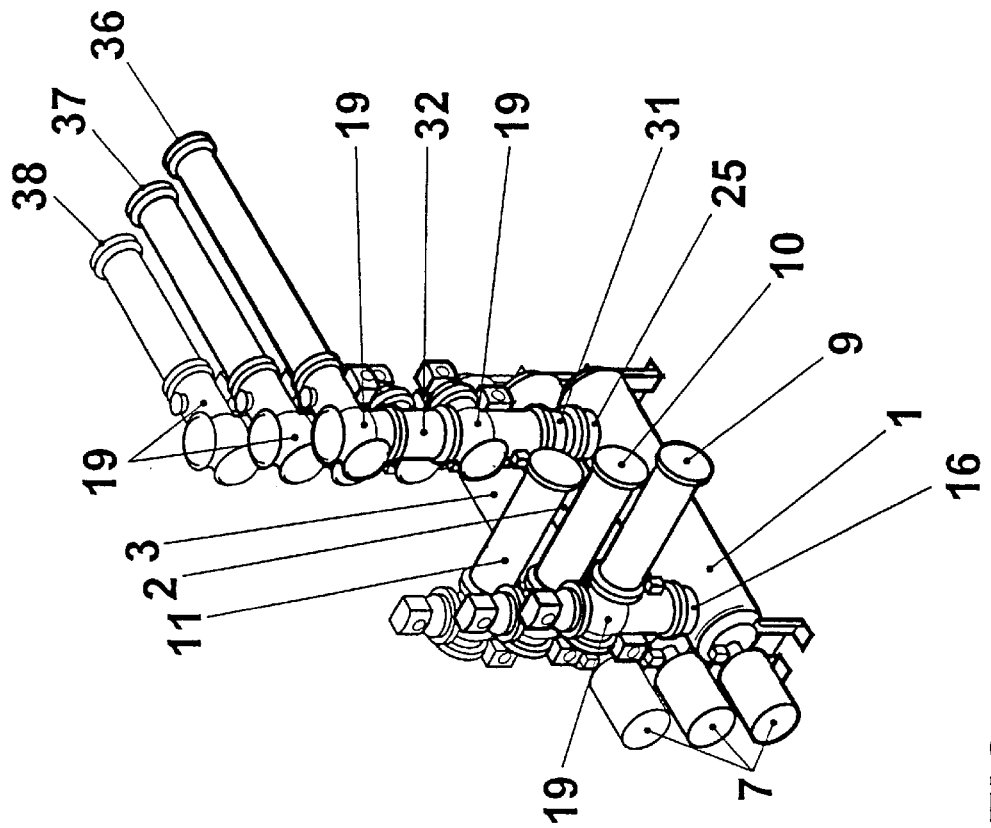
FIG. 1 shows a simplified perspective illustration of a first embodiment of a switch panel, designed as an outgoer panel, for the metal-enclosed, gas-insulated switchgear assembly.
Figure 1C:
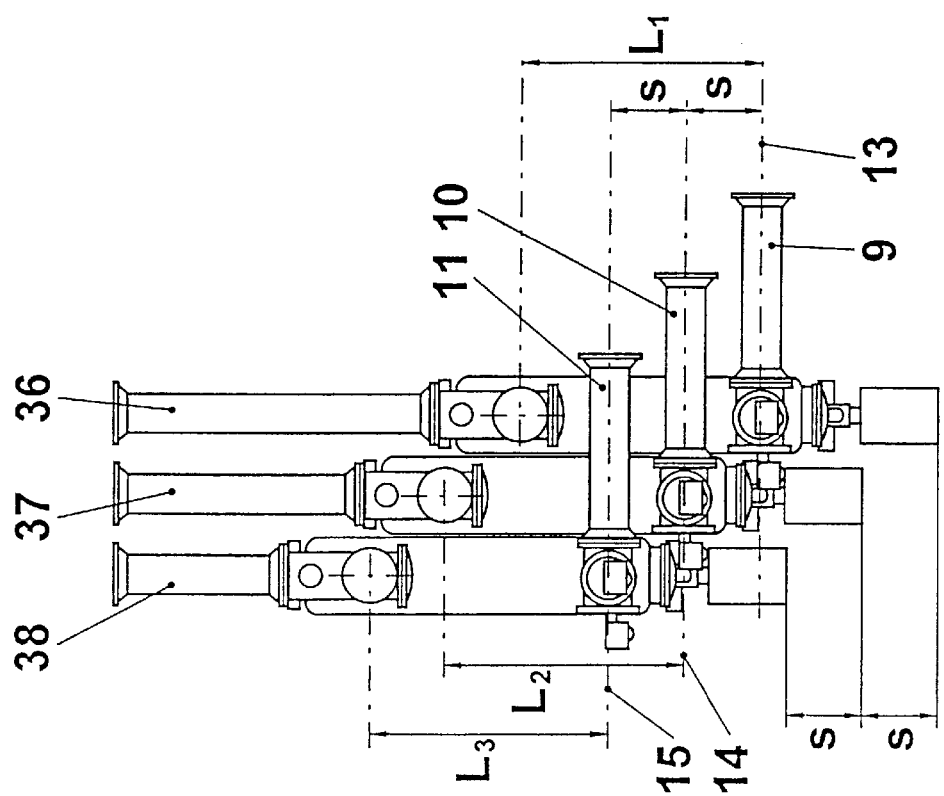
FIG. 1c shows a simplified top plan view of the switch panel according to FIG. 1.
Figure 1A:
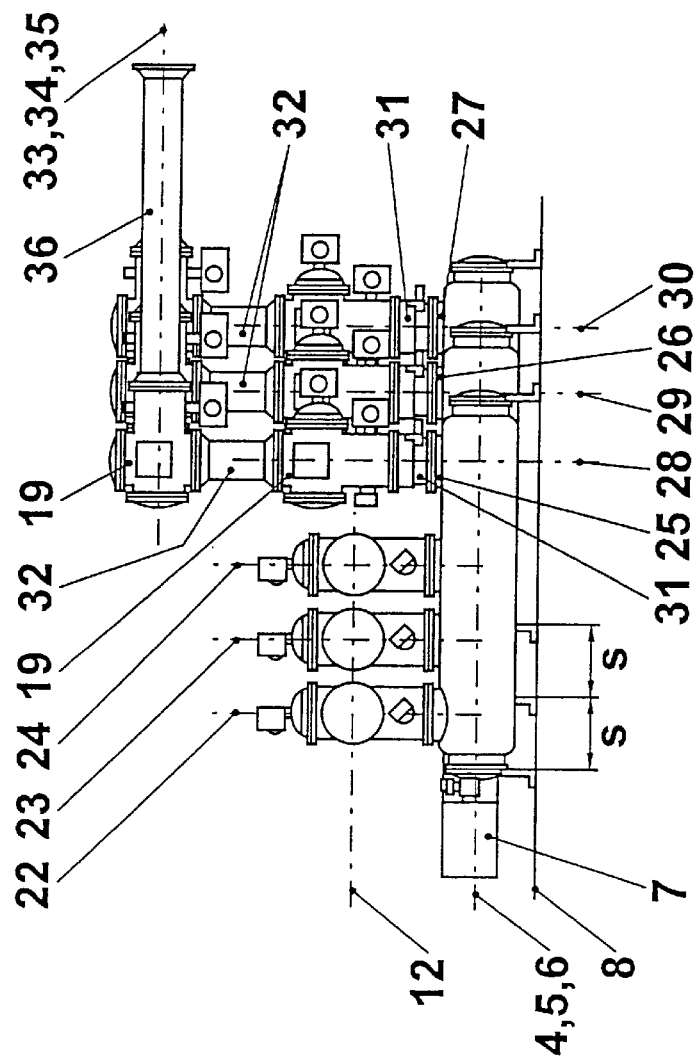
FIG. 1a shows a simplified sides view of the switch panel according to FIG. 1.
Figure 4:
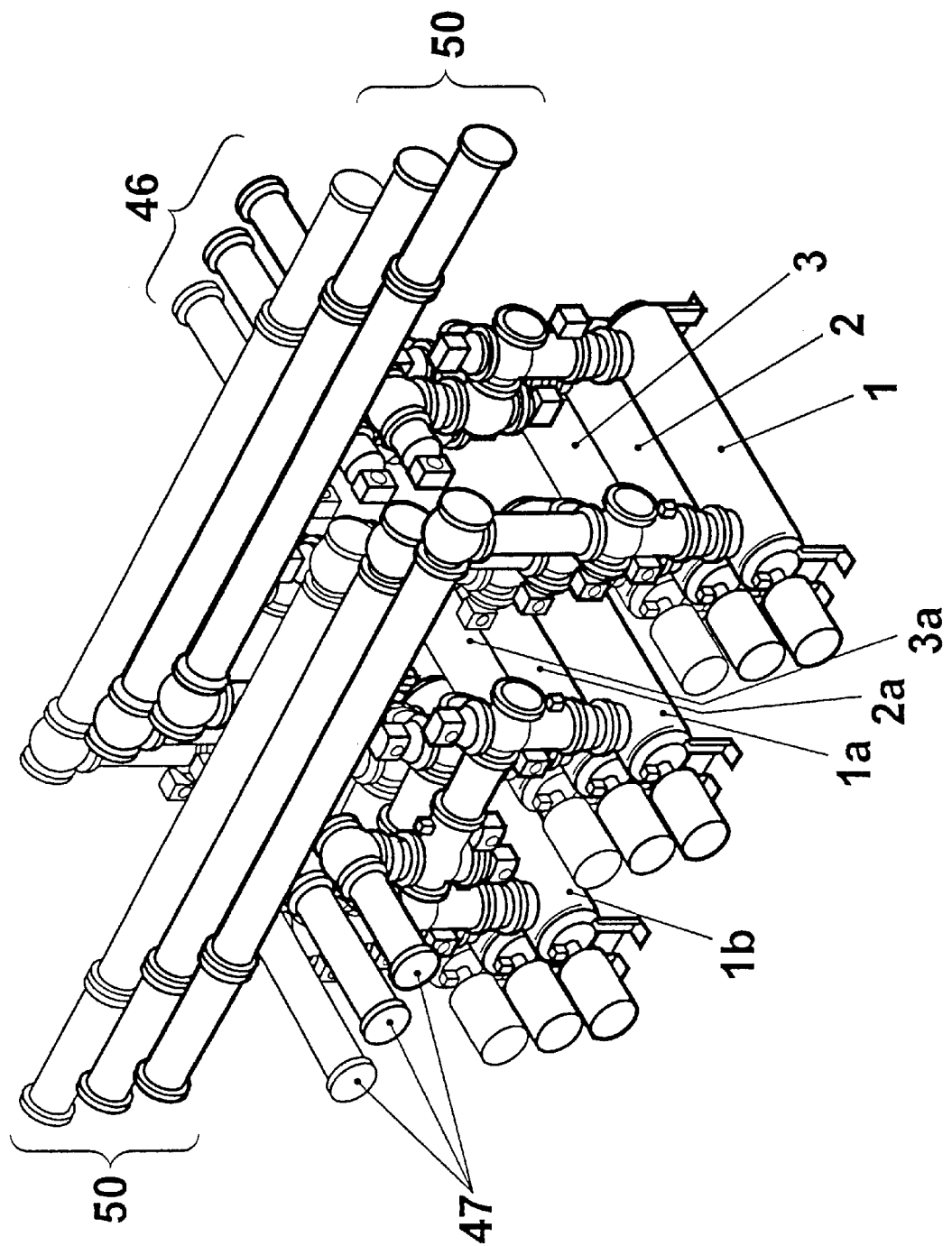
FIG. 4 shows a simplified perspective illustration of a first embodiment of a 1½-switch arrangement composed of three switch panels.
Figure 4B:
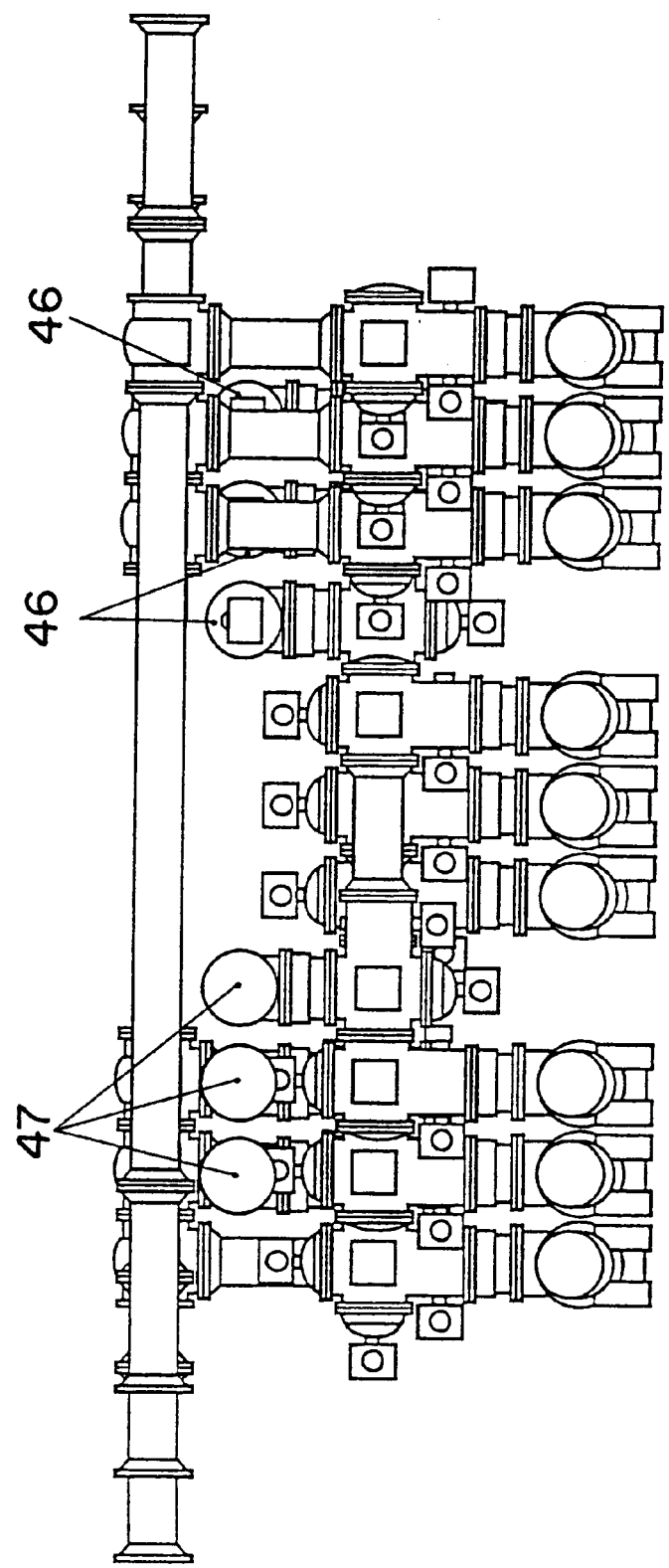
FIG. 4b shows a simplified view of the 1½-switch arrangement according to FIG. 4 from the drive side.
Figure 4C:
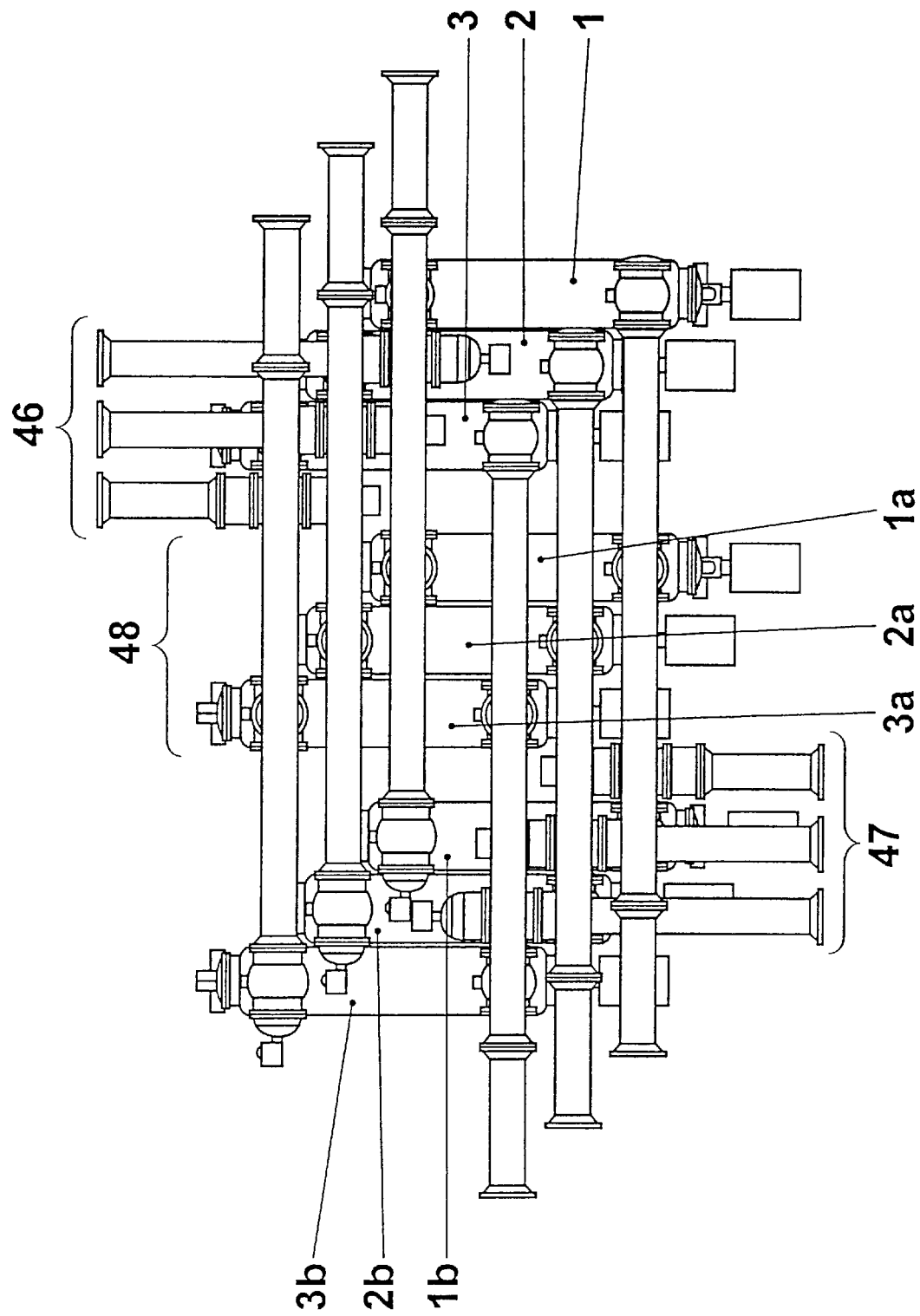
FIG. 4c shows a simplified top plan view of the 1½-switch arrangement according to FIG. 4.

Referring now to the drawings, wherein like reference numerals designate identical or corresponding parts throughout the several views, FIG. 1 shows a simplified perspective illustration of a switch panel, designed as an outgoer panel, for these single-phase metal-enclosed, gas-insulated switchgear assembly, and FIG. 1a shows a simplified side view of this switch panel. The internal areas of the switchgear assembly are filled with an insulating medium, for example with $SF_6$ gas, which is pressurized to about 5 to 6 bar. In this embodiment of the switch panel, the three power breakers 1, 2, 3 are arranged horizontally and parallel to one another, directly alongside one another. The power breakers 1, 2, 3 each have a longitudinal axis 4, 5, 6, the longitudinal axis 4 being associated with the power breaker 1, the longitudinal axis 5 with the power breaker 2, and the longitudinal axis 6 with the power breaker 3. Each of the power breakeres 1, 2, 3 is provided with a tank 1c, a quenching chamber 1d (see FIG.4a), and a separate drive 7. The longitudinal axes 4, 5, 6 in this case lie in a first plane which is arranged parallel to the foundation surface 8 on which the power breakers 1, 2, 3 are mounted. If this should be necessary, this first plane may readily also be arranged at right angles to the foundation surface 8.

The power breakers 1, 2, 3 are offset by a module dimension M in the axial direction. This module dimension M corresponds exactly to the distance s between the axes of the busbars 9, 10, 11, which are placed in a second plane that is indicated by a dashed-dotted line 12. This second plane is arranged parallel to the first plane. As can be seen from the plan view in FIG. 1c, the busbars 9, 10, 11 have axes 13, 14, 15 which run parallel to one another and at right angles to the longitudinal axes 4, 5, 6, the axis 13 being associated with the busbar 9, the axis 14 with the busbar 10, and the axis 15 with the busbar 11.

Figure 1B:
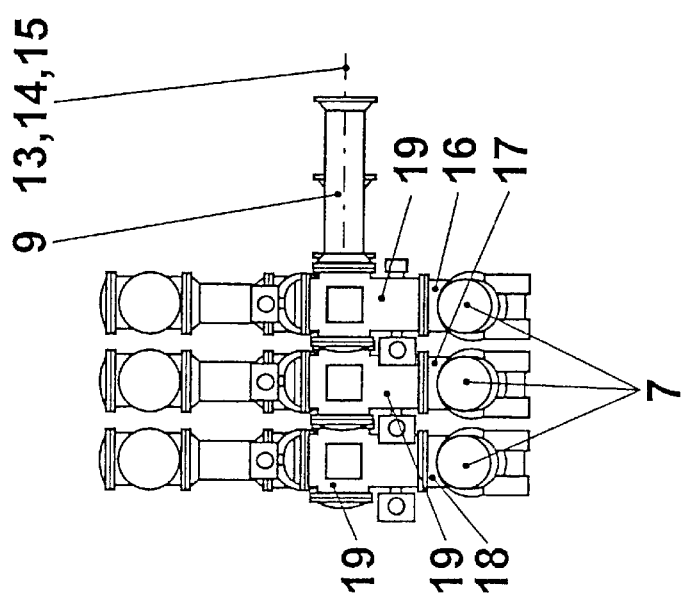
FIG. 1b shows a simplified view of the switch panel according to FIG. 1 from the drive side.

On the drive side, the power breakers 1, 2, 3 have a connecting stub 16, 17, 18 which points vertically upwards, as can be seen in FIG. 1b, the connecting stub 16 being associated with the power breaker 1, the connecting stub 17 with the power breaker 2, and the connecting stub 18 with the power breaker 3. One universal connecting element 19 is flange-connected in a pressure tight manner to each of these connecting stubs 16, 17, 18.

Figure 10:
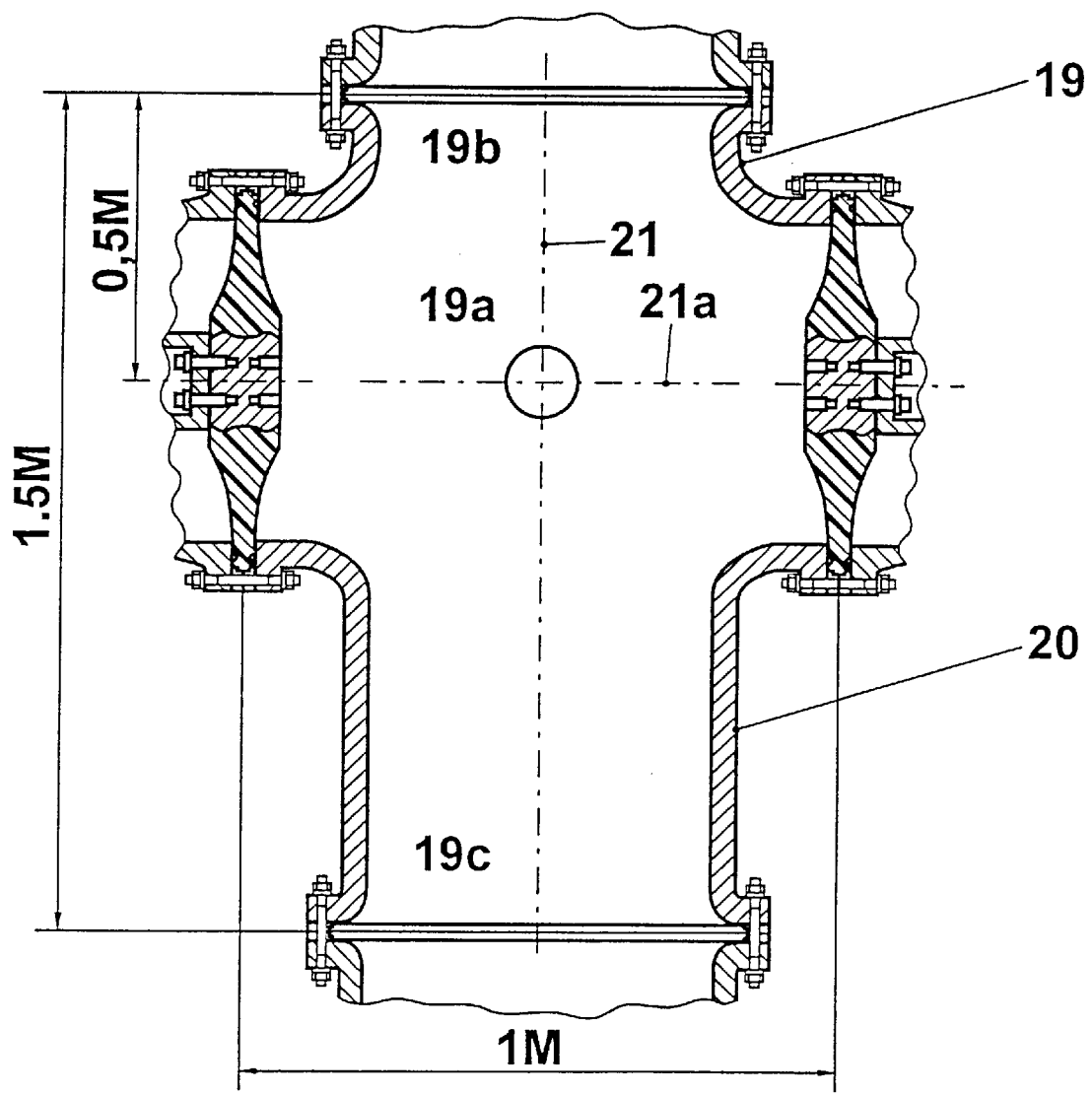
FIG. 10 shows a section through an enclosure which is illustrated in simplified form and is designed as a connecting element.

The connecting element 19, which is illustrated in simplified form in FIG. 10, is based on the enclosure described in Patent Applicator. EP 0 744 803 A2 and therefore does not need to be described in more detail here. As before, it offers the installation options described in the said Patent Application for various disconnector versions. Options, which are not illustrated, for fitting grounding switches, bursting disks, sensors etc. are provided in the newly added extension part 20, which is arranged symmetrically with respect to a longitudinal axis 21. A transverse axis 21a is provided at right angles to the longitudinal axis 21. The longitudinal axis 21 of the connecting element 19 coincides with the respective longitudinal axes 22, 23, 24 of the drive-side connecting stubs 16, 17, 18 of the power breakers 1, 2, 3. The longitudinal axis 22 is associated with the connecting stub 16, the longitudinal axis 23 with the connecting stub 17, and the longitudinal axis 24 with the connecting stub 18. The busbars 9, 10, 11 pass through the respective connecting element 19, an outgoer disconnector being arranged in an area 19a inside the connecting element 19, which outgoer disconnector can interrupt the electrical connection from the busbars 9, 10, 11 for the respectively associated power breakers 1, 2, 3. The upper opening 19b in the connecting elements 19 is in this case closed in a pressure tight manner by a cover, which is fitted with the drive for the outgoer disconnector that is arranged in the internal area 19a.

The length of the connecting element 19 in the direction of the longitudinal axis 21 is 1.5 times the module dimension M between the centers of the sealing flange intermediate layers, and the width of the connecting element 19 in the direction of the transverse axis 21a at right angles to the longitudinal axis 21 corresponds to the module dimension M up to the centers of the isolator flanges. These isolator flanges are designed to be the same thickness as the sealing flange intermediate layers.

On the side facing away from the drive, the power breakers 1, 2, 3 have a connecting stub 25, 26, 27 which points vertically upwards, as can be seen in FIG. 1a, the connecting stub 25 being associated with the power breaker 1, the connecting stub 26 with the power breaker 2, and the connecting stub 27 with the power breaker 3. A longitudinal axis 28 is associated with the connecting stub 25, a longitudinal axis 29 with the connecting stub 26, and a longitudinal axis 30 with the connecting stub 27.

An intermediate piece 31 is in each case flange-connected to the connecting stubs 25, 26, 27 in this case. The intermediate piece 31 may, for example, contain sensors, such as current sensors. The intermediate piece 31 has a physical length which corresponds to 0.5 times the module dimension M. A connecting element 19 is placed on each of the intermediate pieces 31 such that its longitudinal axis 21 coincides with the longitudinal axes 28, 29, 30. A series disconnector is fitted in these connecting elements 19, which series disconnector can interrupt the electrical connection between an outgoer and the respectively associated power breaker 1, 2, 3. An intermediate tube 32 is in this case placed in a pressuretight manner on the upper opening 19b of the connecting element 19. The intermediate tube 32 has a physical length which corresponds to the module dimension M itself. A further connecting element 19 is fitted to the intermediate tube 32, to be precise in such a manner that the transverse axis 21a coincides with the respective longitudinal axis 28, 29, 30. The longitudinal axis 21 of these connecting elements 19 coincides with the longitudinal axes 33, 34, 35 (which lie in a third plane) of outgoers 36, 37, 38. FIG. 1 shows the outgoers 36, 37, 38 arranged parallel to one another. However, if, for example, the ends of the outgoers 36, 37, 38 are provided with high-voltage bushings for a junction to a high-voltage overhead line, then the outgoers 36, 37, 38 must be spread apart in order to achieve the voltage separations required at their end for the overhead line. This spreading of the outgoers 36, 37, 38 is achieved simply by twisting the intermediate tubes 32.

A three-phase auxiliary busbar could in this case also be placed on the upper openings of the connecting elements 19 which are located transversely at the top, providing an elbow disconnector for the connection of this auxiliary busbar were fitted into each of these connecting elements 19. The active parts, which are always present for the electrical connections in the interior of the said metal enclosure, are not described in any more detail here.

Figure 2:
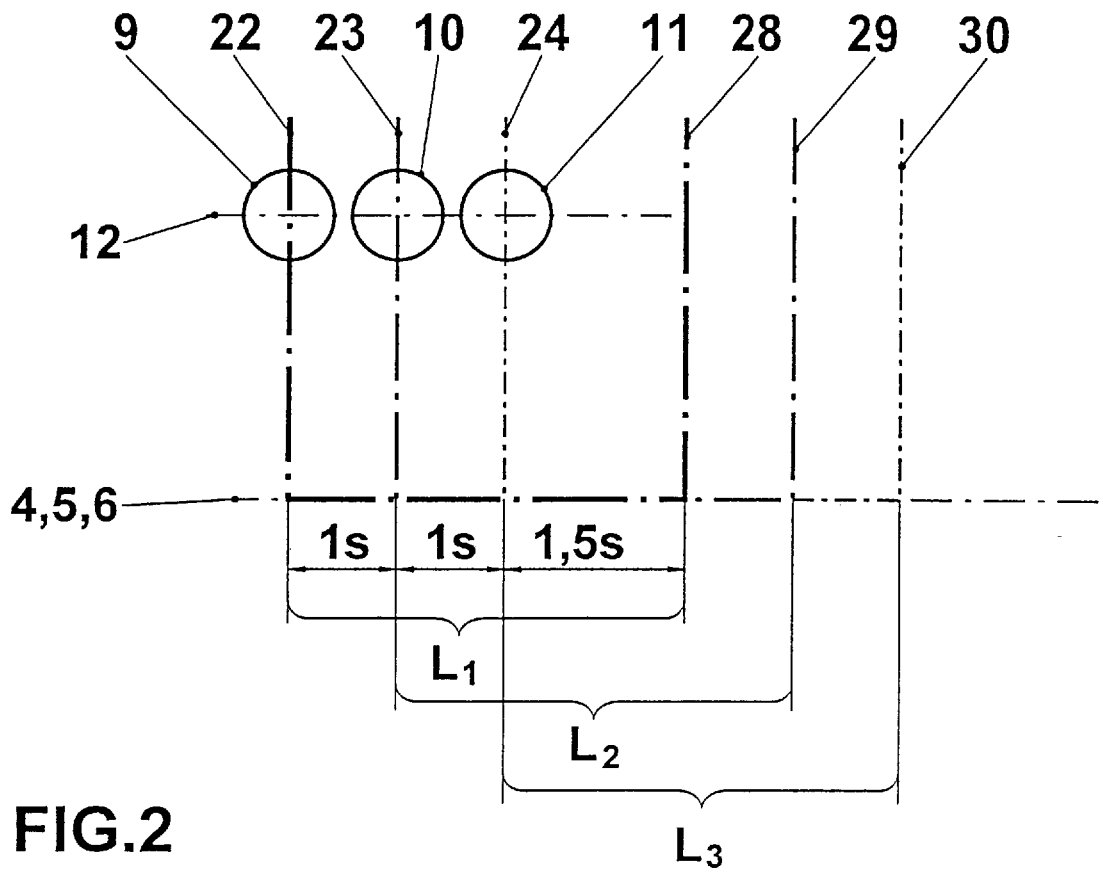
FIG. 2 shows the schematically illustrated arrangement of the busbars and of the power breakers in the switch panel according to FIG. 1.

FIG. 2 shows the schematically illustrated arrangement of the busbars 9, 10, 11 and of the longitudinal axes (which are important in conjunction with the arrangement of the power breakers 1, 2, 3) in the switch panel according to FIG. 1 and FIG. 1a. the longitudinal axes 4, 5, 6 of the power breakers 1, 2, 3 lie in a first plane parallel to the foundation surface 8. The longitudinal axes 22 and 28 of the outgoers from the power breaker 1 are in this case arranged at the distance $L_1$ in the exemplary embodiment. The longitudinal axes 23 and 29 of the terminals of the power breaker 2 are in this case arranged at a distance $L_2$ in the exemplary embodiment. The longitudinal axes 24 and 30 of the terminals of the power breaker 3 are in this case arranged at a distance $L_3$ in the exemplary embodiment. However, as a result of the uniform offset of the power breakers 1, 2, 3, the three distances $L_1$, $L_2$, $L_3$ are of equal magnitude, namely in each case corresponding to 3.5 times the distance s between the busbars, or corresponding to 3.5 times the module dimension M.

The U-shaped region between the longitudinal axes 22, 4 and 28 above the power breaker 1 has a width of 3.5 M and is sufficient to accommodate all three busbars 9, 10, 11, only half of the cross section of the busbar 9 being located in this region. The U-shaped region between the longitudinal axes 23, 5 and 29 above the power breaker 2 has a width of 3.5 M, but accommodates only two busbars 10 and 11, only half of the cross section of the busbar 10 being located in this region, as can clearly be seen in FIG. 1c. In the case of the power breaker 2, the busbar 9 is routed outside the indicated region. The U-shaped region between the longitudinal axes 24, 6 and 30 above the power breaker 3 has a width of 3.5 M, but accommodates only part of one busbar 11, only half of the cross section of the busbar 11 being located in this region, as can clearly be seen from FIG. 1c. In the case of the power breaker 3, the busbars 9 and 10 are routed outside the indicated region. In fact, U-shaped regions with a width of 3 M would be sufficient for mounting of the busbars 9, 10, 11, but the width of 3.5 M was chosen.

This horizontal arrangement of he busbars 9, 10, 11 allows these busbars to be arranged at a comparatively short distance from the foundation surface 8 so that, in the event of any mechanical or electrical dynamic impulse loads, mechanically induced oscillations can occur only to a small extent, the outgoer part on the side of the power breakers 1, 2, 3 facing away from the drive 7 is likewise designed to be at a comparatively low level, so that the center of gravity of the entire switch panel is located at a low level, and this has a particularly advantageous effect in the event of earthquake loads. This switch panel, which is equipped with a single busbar, has a particularly compact design, advantageously resulting in small transport units.

Figure 3:
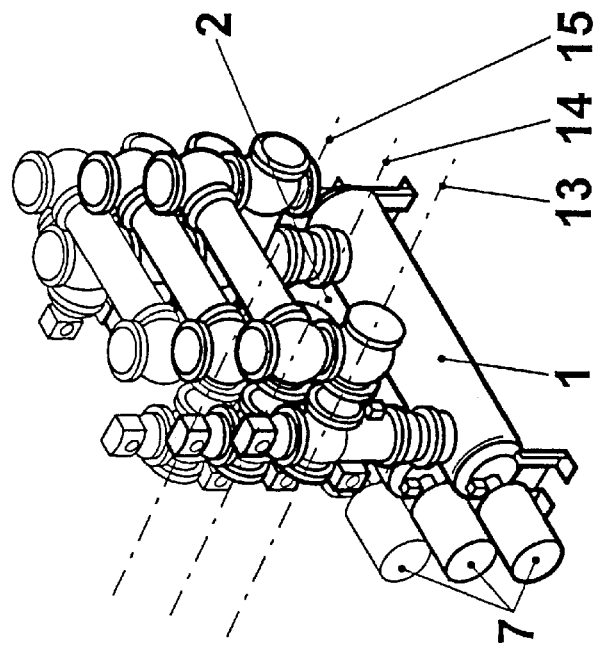
FIG. 3 shows a simplified perspective illustration of one embodiment of a switch panel designed as a coupling panel for longitudinal coupling of busbars in the metal-enclosed, gas-insulated switchgear assembly.
Figure 3C:
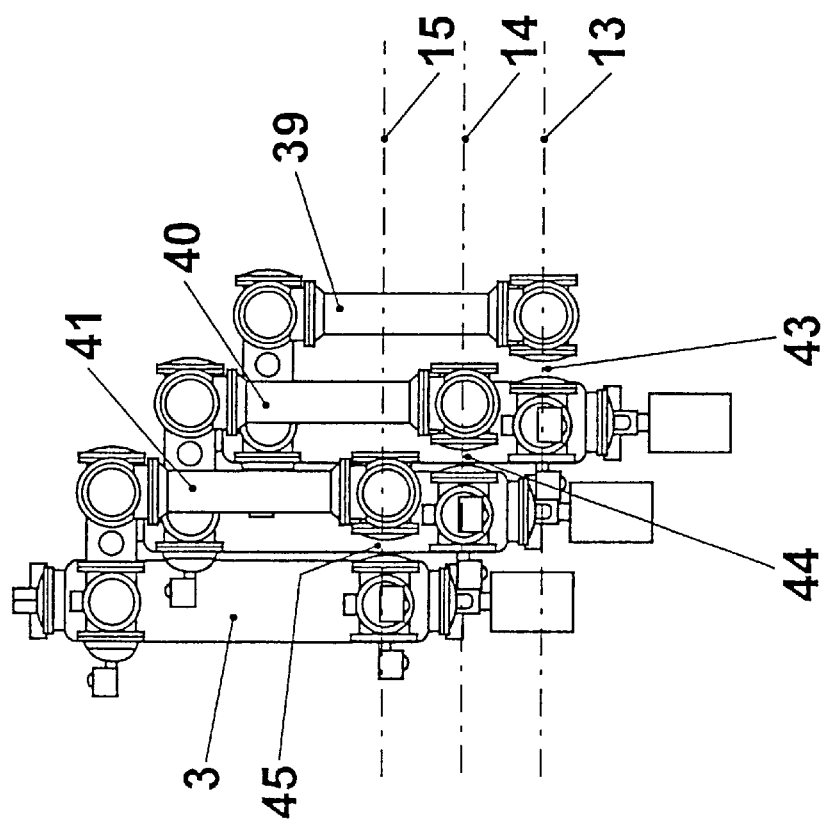
FIG. 3c shows a simplified top plan view of the coupling panel according to FIG. 3.
Figure 3A:
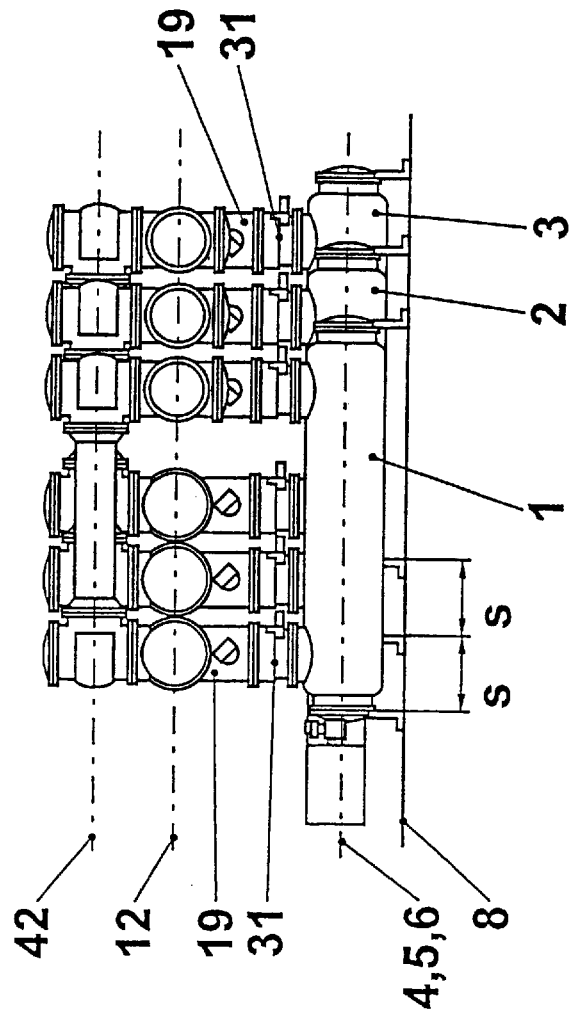
FIG. 3a shows a simplified side view of the coupling panel according to FIG. 3.
Figure 3B:
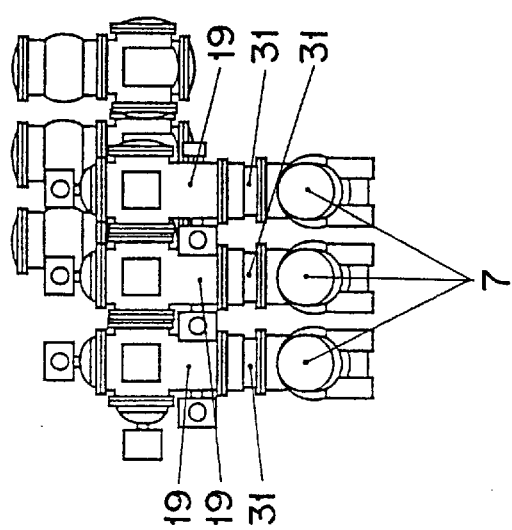
FIG. 3b shows a simplified view of the coupling panel according to FIG. 3 from the drive side.

FIGS. 3, 3a, 3b and 3c shows a simplified illustration of an embodiment of a switch panel, designed as a coupling panel for longitudinal coupling of busbars, for the metal-enclosed, gas-insulated switchgear assembly. This coupling panel likewise has a very compact design. The simplified plan view of the coupling panel in FIG. 3c shows the axes 13, 14, 15 of the busbars, which are not illustrated but are connected to this coupling panel from the left. Each of the busbars is electrically conductively connected on the drive side to the associated power breaker, in each case one connecting element 19 and one intermediate piece 31 being used for this purpose. The electrical path continues on the side facing away from the drive 7, likewise in each case through an intermediate piece 31 and a connecting element 19. At the level of the second plane, which is indicated by the dashed-dotted line 12, in which the axes 13, 14, 15 of the busbars lie, the current path bends into a direction parallel to the axes 13, 14, 15 and then into a direction at right angles to the second plane. Connecting rails 39, 40, 41, which lie in a further plane (which is indicated by the dashed-dotted line 42) above the busbars, make contact from above with the corresponding busbars, which continue away from the coupling panel to the right, along the axes 13, 14, 15. The further plane is located above the busbars by an amount equal to the module dimension M. Visible intermediate areas 43, 44, 45, see FIG. 3c, remain between the enclosures of the incoming busbars and the enclosures of the continuing busbars lying in the same plane. This coupling panel for longitudinal coupling of busbars is, distinguished by a particularly small physical height.

FIGS. 4, 4a, 4b and 4c show a simplified illustration of a first embodiment of a 1½-switch arrangement composed of three switch panels, namely 2 outgoer panels 46 and 47 and a coupling panel 48 arranged between them. The two continuous busbar systems 49 and 50 are located above the plane for the outgoers but within the U-shaped regions above the power breakers, in a similar manner to that described in conjunction with FIG. 2. The distances between the axes are the same as those in FIG. 2. The power breakers 1, 2, 3 are associated with the outgoer panel 46, the power breakers 1a, 2a, 3a with the coupling panel 48, and the power breakers 1b, 2b, 3b with the second outgoer panel 47.

The three power breakers associated with each switch panel are arranged offset with respect to one another, as is described with respect to the above exemplary embodiments. This 1½-switch arrangement has been constructed in a particularly compact and space-saving manner.

The other exemplary embodiments relate to the switch panels in which the power breakers 1, 2, 3 are designed to be identical to those which have already been described, but they are now placed in a row, aligned directly alongside one another. Like the installation of those power breakers which are arranged offset, this installation version also offers a wide range of mounting versions for switch panels.

FIGS. 5, 5a, 5b and 5c show a simplified illustration of a second embodiment of a switch panel, designed as an outgoer panel, for the metal-enclosed, gas-insulated switchgear assembly. In this switch panel, the busbars 60, 61, 62 which are designed as single busbars have a distance s between their axes which corresponds to the module dimension M and are arranged vertically one above the other, completely outside the U-shaped region of the power breakers 1, 2, 3. However, these busbars 60, 61, 62 could also be arranged completely inside the U-shaped region. The axes 63, 64, 65 of the busbars 60, 61, 62 lie in a plane which is indicated by a dashed-dotted line 66 and which is arranged at right angles to the foundation surface 8 and to the first plane. The direction of the axes 63, 64, 65 of the busbars 60, 61, 62 runs at right angles to the direction of the longitudinal axes 4, 5, 6 of the power breakers 1, 2, 3. The busbar 60 is connected to the power breaker 1, the busbar 61 to the power breaker 2, and the busbar 63 to the power breaker 3. The connections on the drive side to the busbars 60, 61, 62 have been made by means of connecting elements 19 and intermediate pieces 31 so as to achieve the same distance s between the axes of the busbars 60, 61, 62 as in the case of the previous exemplary embodiments. The design of the pillar which in each case supports the outgoer corresponds to that which is illustrated in FIG. 1a. The outgoer is indicated by an axis 67. The connecting element 19 has in this case been inserted horizontally, as can be seen from FIG. 5, in each case as part of the busbars 60, 61, 62.

Figure 6:
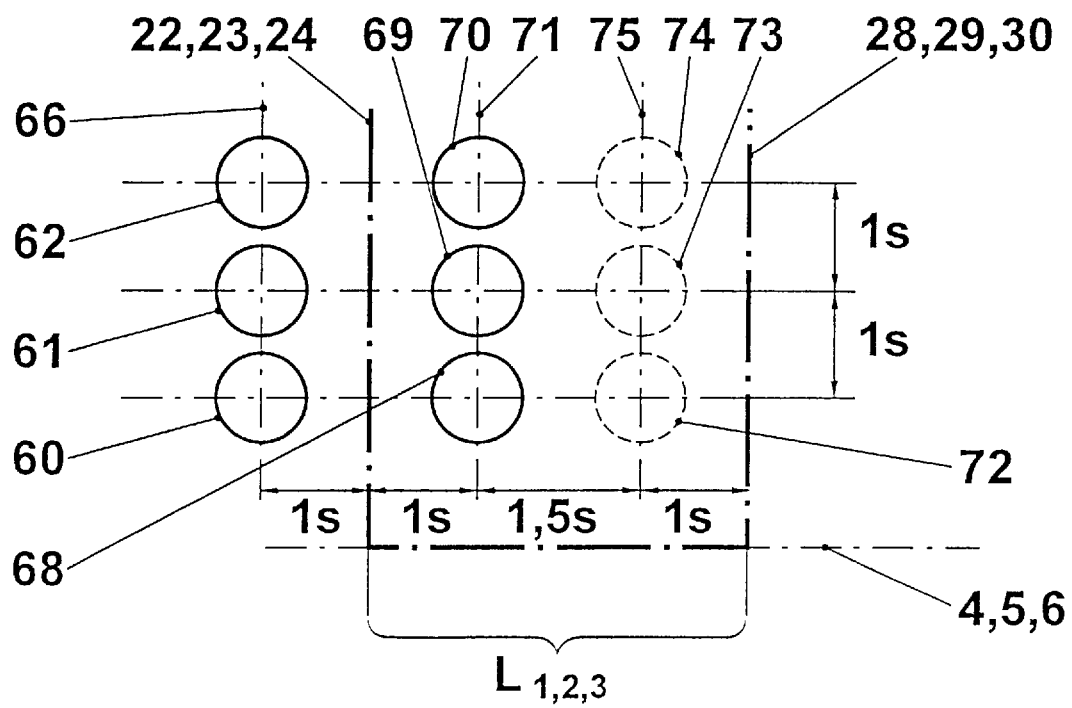
FIG. 6 shows the schematically illustrated arrangement of the busbars and of the power breakers in the switch panel according to FIG. 5.
Figure 5:
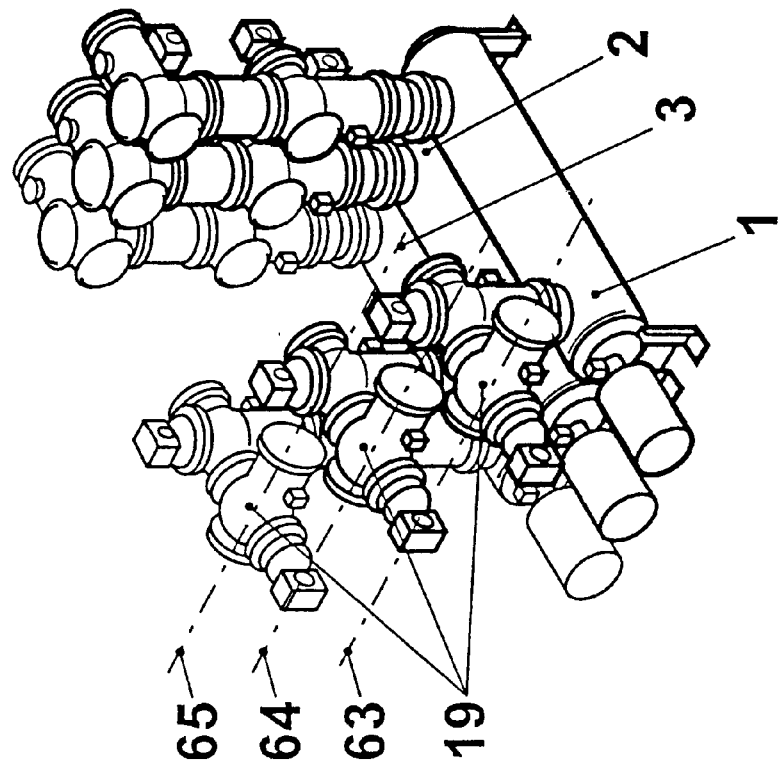
FIG. 5 shows a simplified perspective illustration of a second embodiment of a switch panel, designed as an outgoer panel, for the metal-enclosed, gas-insulated switchgear assembly.
Figure 5C:
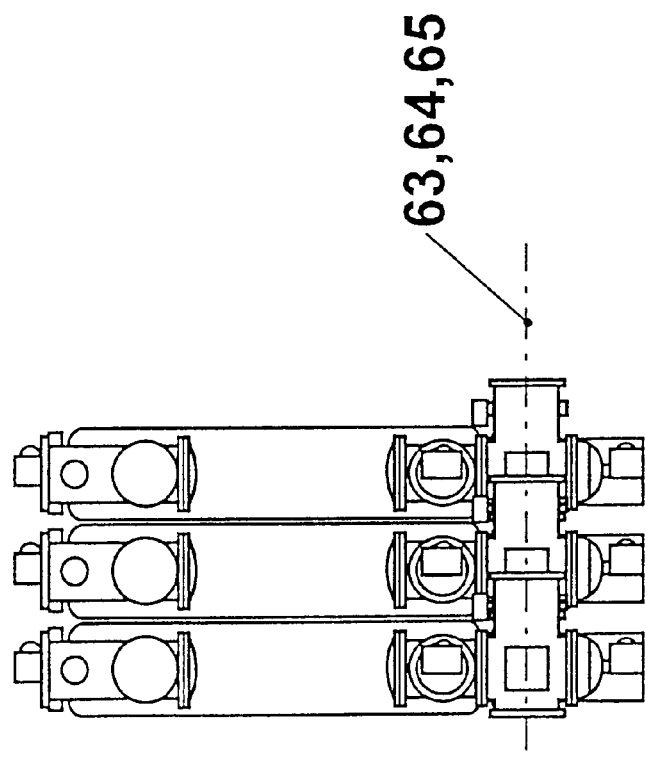
FIG. 5c shows a simplified top plan view of the switch panel according to FIG. 5.
Figure 5A:
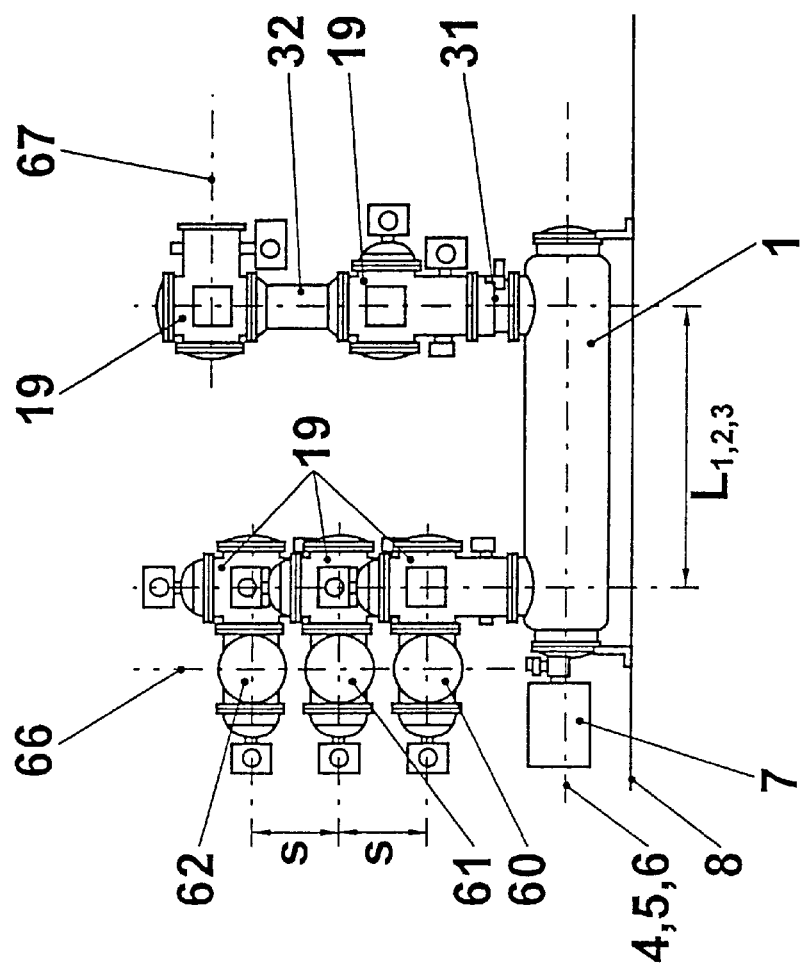
FIG. 5a shows a simplified side view of the switch panel according to FIG. 5.
Figure 5B:
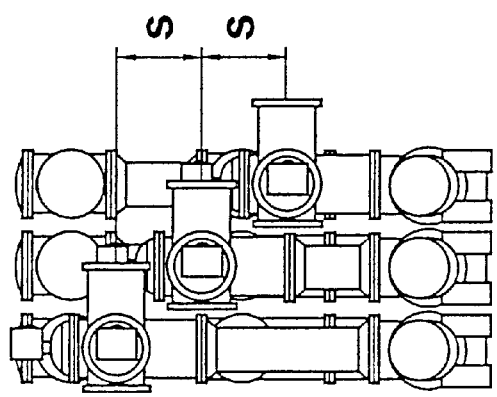
FIG. 5b shows a simplified view of the switch panel according to FIG. 5 from the drive side.
Figure 7:
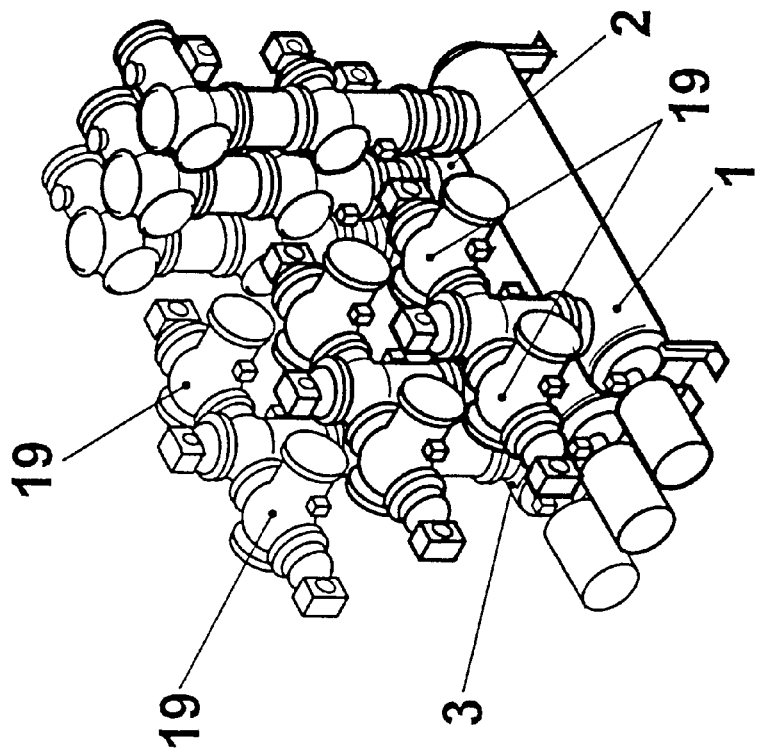
FIG. 7 shows a simplified perspective illustration of a third embodiment of a switch panel, designed as an outgoer panel, for the metal-enclosed, gas-insulated switchgear assembly.
Figure 7C:
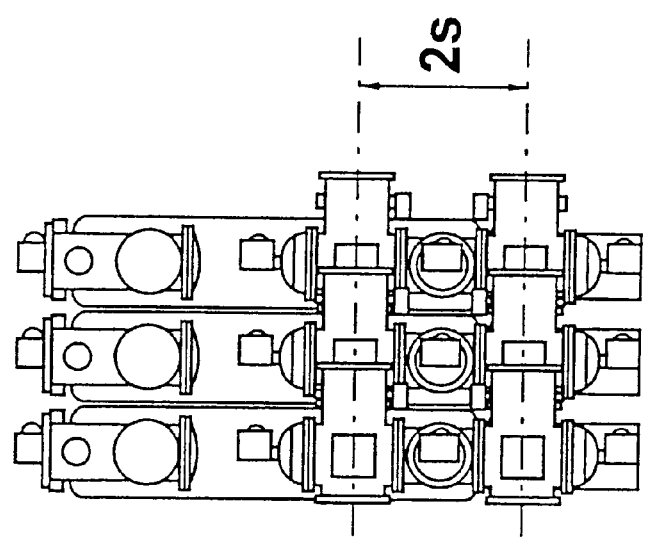
FIG. 7c shows a simplified top plan view of the switch panel according to FIG. 7.
Figure 7A:
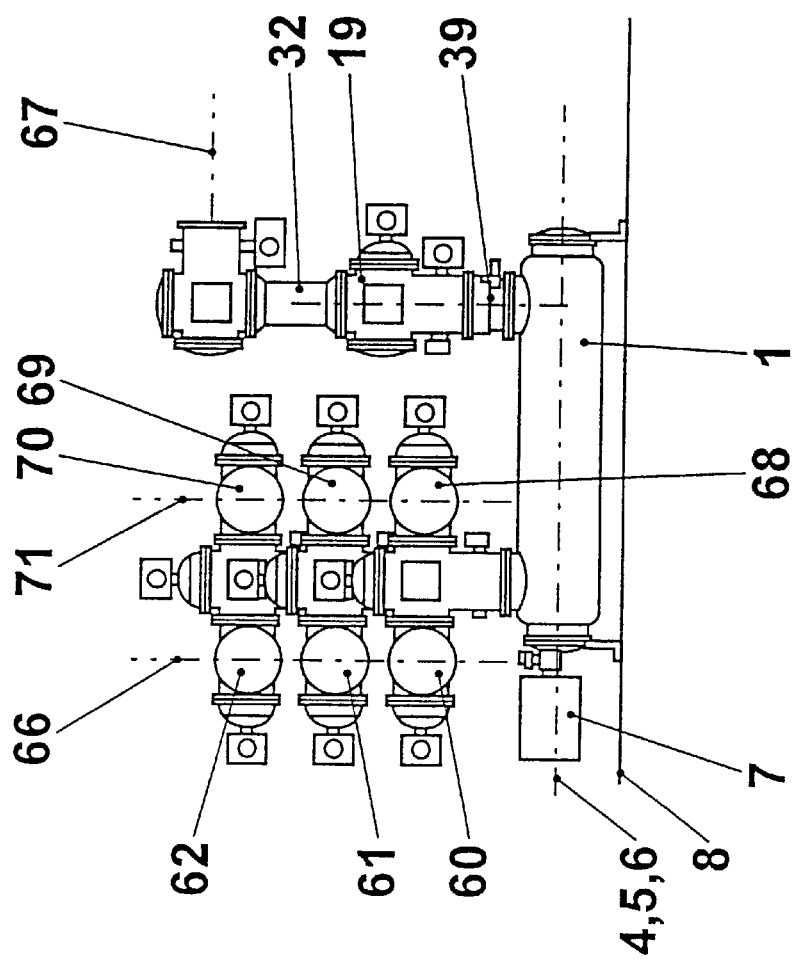
FIG. 7a shows a simplified side view of the switch panel according to FIG. 7.
Figure 7B:
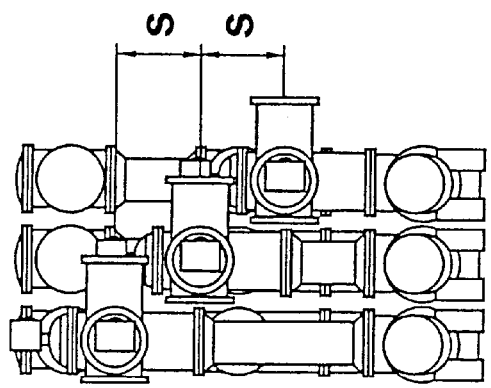
FIG. 7b shows a simplified view of the switch panel according to FIG. 7 from the drive side.

FIG. 6 shows the schematically illustrated arrangement of the busbars 60, 61, 62 and of the power breakers in the switch panel according to FIG. 5, as well as other arrangement options for busbars. The busbars 60, 61, 62 are arranged vertically one above the other and outside the U-shaped region at a distance s from the longitudinal axes 22, 23, 24 of the drive-side connecting stubs 16. 17, 18 of the power breakers 1, 2, 3. If the intention is to equip the switchgear assembly with a double-busbar system, then the additional busbars 68, 69, 70 are arranged as a mirror image of the busbars 60, 61, 62 at a distance s from the longitudinal axes 22, 23, 24 in the interior of the U-shaped region above the power breakers 1, 2, 3. The axes of these busbars 68, 69, 70 run in a plane which is indicated by a dashed-dotted line 71, parallel to the busbars 60, 61, 62. The mutually associated busbars are located at the same height.

FIGS. 7, 7a, 7b and 7c show a simplified illustration of a third embodiment of a switch panel, designed as an outgoer panel, for the metal-enclosed, gas-insulated switchgear assembly. This switchgear assembly is equipped with a double busbar. The axes of these busbars 68, 69, 70 run in a plane, which is indicated by a dashed-dotted line 71, parallel to the busbars 60, 61, 62. The busbars 68, 69, 70 are routed identically, as has been described in conjunction with the busbars 60, 61, 62 in FIG. 5. The outgoer indicated by the axis 67 is designed identically to that in FIG. 1.

Figure 8:
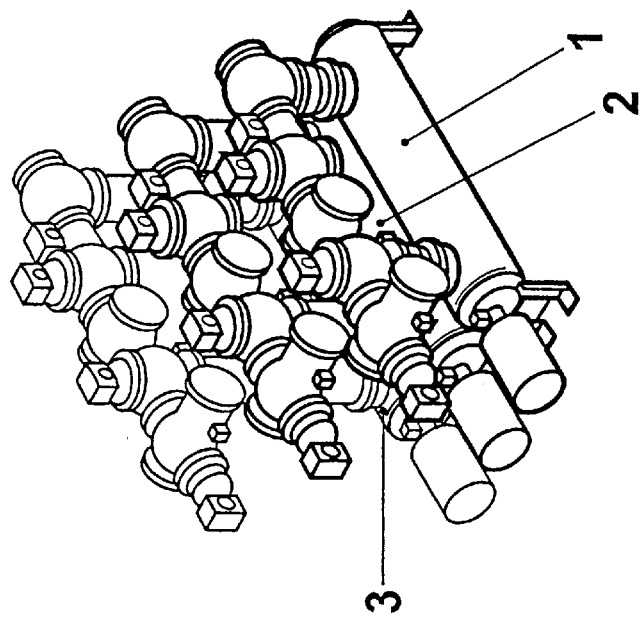
FIG. 8 shows a simplified perspective illustration of one embodiment of a switch panel, designed as a coupling panel for transverse coupling of busbars, for the metal-enclosed, gas-insulated switchgear assembly.
Figure 8A:
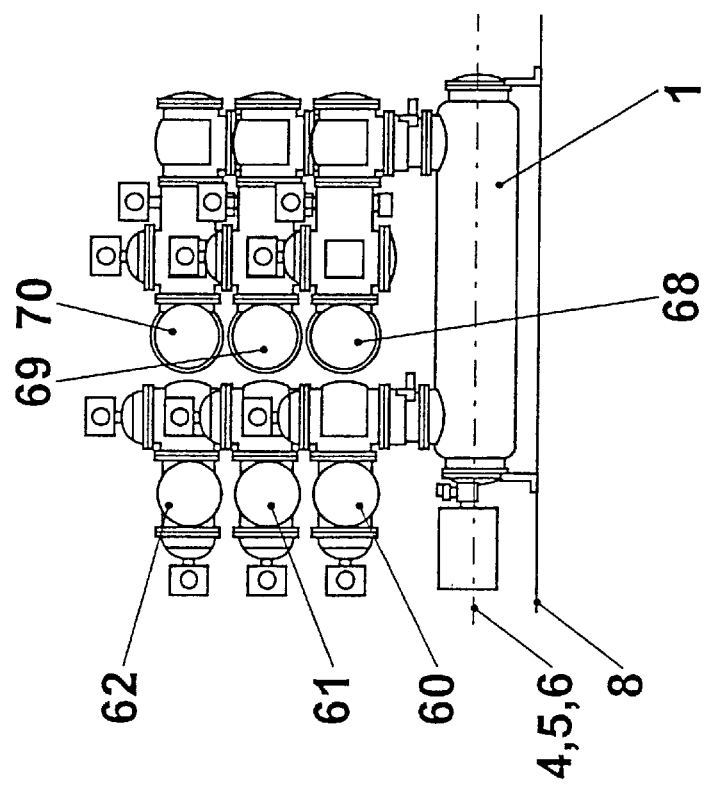
FIG. 8a shows a simplified side view of the coupling panel according to FIG. 8.

FIGS. 8 and 8a show a simplified illustration of an embodiment of a switch panel, designed as a coupling panel for the cross-coupling of busbars, for the metal-enclosed gas-insulated switchgear assembly with the double-busbar arrangement. The busbars 60, 61, 62 and the busbars 68, 69, 70 are arranged in the same grid as that illustrated in FIG. 6. In this cross-coupling panel the busbar 60 is connected via the power breaker 1 to the busbar 68, the busbar 61 is connected via the power breaker 2 to the busbar 69, and the busbar 62 is connected via the power breaker 3 to the busbar 70. This cross-coupling panel has a very compact instruction and has a comparatively particularly low physical height.

Figure 9:
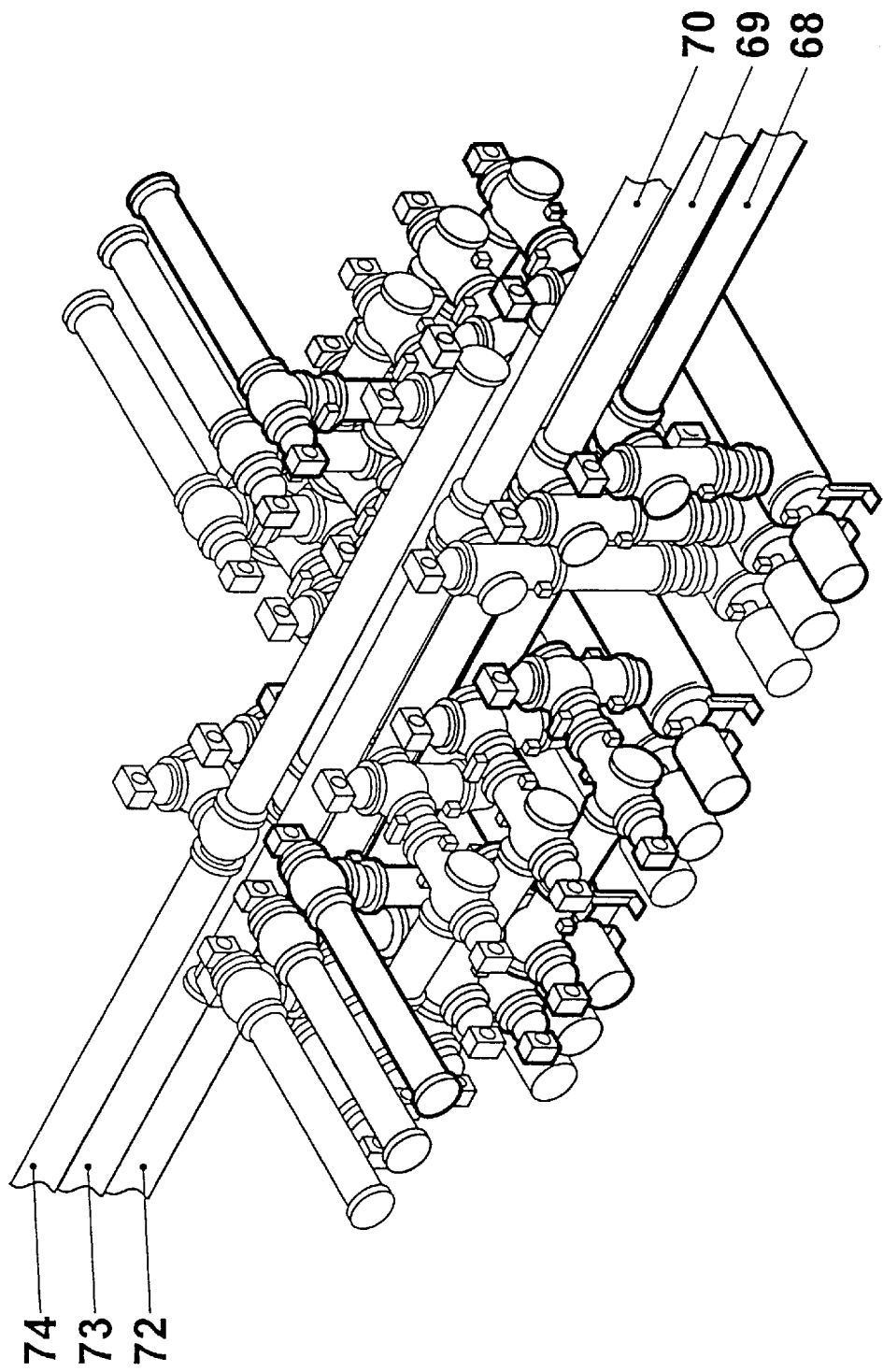
FIG. 9 shows a simplified perspective illustration of a second embodiment of a 1½-switch arrangement composed of three switch panels.
Figure 9A:
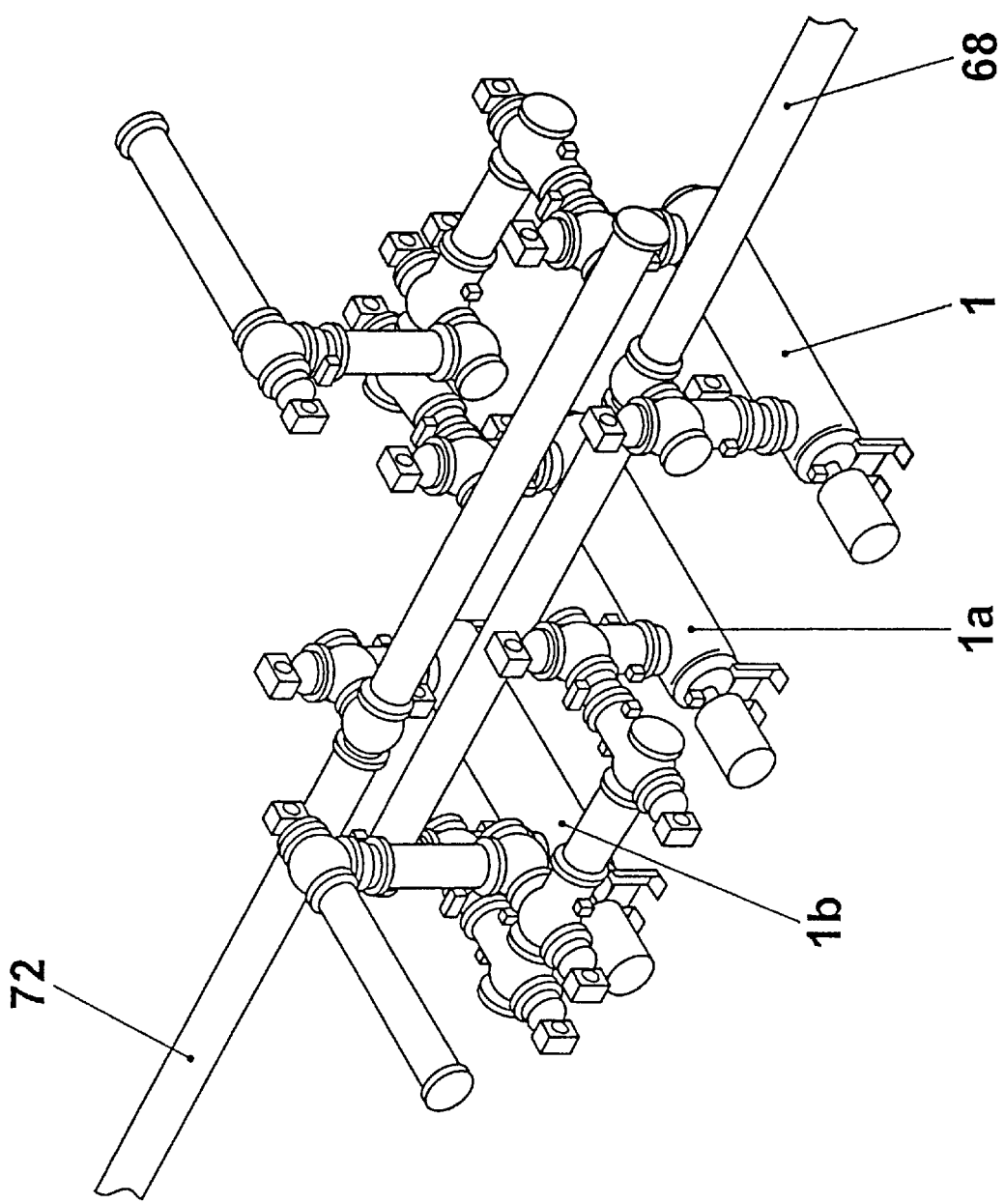
FIG. 9a shows a simplified perspective illustration of a single phase, drawn removed, of the embodiment of the 1½-switch arrangement according to FIG. 9.

FIG. 9 shows a simplified perspective illustration of a second embodiment of a 1½-switch arrangement composed of three switch panels. In this arrangement, the two busbar systems are located within the U-shaped region above the power breakers 1, 2, 3, 1a, 2a, 3a, 1b, 2b and 3b. This advantageously compact arrangement of busbars is also obtained for switchgear assemblies which are designed as a ring circuit or as a double-switch arrangement. In FIG. 6, these are the busbars 68, 69, 70 and the busbars 72, 73, 74 which are illustrated alongside the former by dashed lines. The busbars 72, 73, 74 are arranged in a plane which is indicated by a dashed-dotted line 75 and is at a distance of 1.5 times the module dimension M from the plane, indicated by the dashed-dotted line 71, parallel to it. The axes of the two busbar systems run parallel to one another. For the sake of clarity, FIG. 9a shows a single phase, which has been drawn removed, of the embodiment of the 1½-switch arrangement according to FIG. 9. This clearly shows the design of the 1½-switch arrangement. The space required for this 1½-switch arrangement is very small, since the two busbar systems are accommodated completely within the U-shaped region which is located above the power breakers and is always present anyway, and require no additional space whatsoever. This arrangement has an advantageously low center of gravity, and particularly short connecting paths.

The switch panels described here with power breakers which are arranged offset and aligned in a row are all constructed in a consistent modular manner, using a grid with the module dimension M, upward from the upper edge of the connecting stubs 16, 17, 18 and the connecting stubs 25, 26, 27. This makes it possible advantageously to minimize the number of connecting parts required, which considerably simplifies stockholding and stock control. The module dimension M is chosen such that the physical height of the switch panels is considerably less than that of conventional arrangements. Equating the module dimension M to the distance s between the busbar axes allows particularly space-saving arrangements for switch panels, as the described exemplary embodiments show. The distance between adjacent power breakers may, but need not, be matched to the modular grid.

The two installation versions for the power breakers advantageously increase the number of possible switch panel configurations, and to some extent it is even possible to produce specific standard circuits with the two installation versions, so that it is in each case possible to choose the configuration which best matches the physical and financial conditions. Such advantageous flexibility considerably simplifies the engineering of metal-enclosed, gas-insulated switchgear assemblies. Furthermore, it is advantageous that the switch panels have a very compact design, which is highly positive both with respect to earthquake protection and with respect to small transport units.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letter Patent of the United States is:

1. A single-phase, metal-enclosed, gas-insulated switchgear assembly comprising:
   a multiphase switch panel including a plurality of phases which are arranged immediately adjacent each other, each phase having:
   at least one power breaker having a drive side and which extends along a first longitudinal axis, said first longitudinal axes being arranged in a first plane;
   a first connecting stub which is provided on said drive side of said power breaker and points away from said first plane;
   a second electrical connecting stub which is provided on a side of said power breaker opposite said drive side and which points away from said first plane, parallel to the first connecting stub;
   a busbar system which is arranged in a second plane and extends along parallel busbar axes, said busbar axes extending in a direction at right angles to the direction of the first longitudinal axes and have a distance S between them;
   said first stubs having centers and defining a distances between said first connecting stubs' centers, wherein a distance between centers of a first connecting stub and a second connecting stub is at least three time and at most four times as great as said distance S, said distance S representing module dimension M;
   wherein said power breakers are offset with respect to one another by said module dimension M; and
   wherein said second plane is arranged parallel to said first plane.

2. A metal-enclosed, gas-insulated switchgear assembly comprising:
   a multiphase switch panel including a plurality of phases, each phase having:
   at least one power breaker having a drive side and which extends along a first axis, said power breakers being arranged aligned alongside one another in a row, said first axes being arranged in a first plane;
   a first connecting stub which is provided on said drive side of said power breaker and points away from said first plane;
   a second connecting stub which is provided on a side of said power breaker opposite said drive side and which points away from said first plane, parallel to said first connecting stub;
   a busbar system which is arranged in a second plane and extends along parallelbusbar axes, said busbar system being at right angles to said first plane and in, said busbar axes extending at right angles to the direction of said first axes and have a distance S between them;
   said connecting stubs having centers and defining distances between said first connecting stubs' center, wherein a distance between centers of a first connecting stub and a second connecting stub is at least three times and at most four times as great as said distance S said distance S representing a module dimension M.

3. The switchgear assembly as claimed in claim 1, wherein said switchgear assembly is mounted on a foundation surface, and said first plane is parallel to said foundation surface.

4. The switchgear assembly as claimed in claim 1, wherein said distance between centers of said first connecting stub and said second connecting stub is 3.5 times said module dimension M.

5. The switchgear assembly as claimed in claim 1, wherein said power breakers each comprise a tank having a quenching chamber, and wherein said quenching chamber is removable from both ends of said tank.

6. The switchgear assembly as claimed in claim 1, wherein said connecting stubs each comprise top edges; and
   further comprising longitudinally stepped mounting elements for modularly constructing said switch panel from a top edge of said connecting stubs.

7. The switchgear assembly as claimed in claim 6, wherein said mounting elements comprise intermediate pieces having a length half said module dimension M;
   wherein said mounting elements further comprise intermediate tubes whose length is equal to said module dimension M; and
   wherein said mounting elements further comprise connecting elements each having a longitudinal axis and a transverse axis at right angles to said connecting element longitudinal axis, which connecting elements have a length of 1.5 times said module dimension M along said connecting element longitudinal axis, and which connecting elements have a length equal to said module dimension M along said transverse axis right.

8. The switchgear assembly as claimed in claim 7, wherein said connecting element comprises four flanged openings having the same diameter, two of said openings having as their center said connecting element transverse axis, and two other of said openings having as their center said connecting element longitudinal axis which forms an axis of symmetry;
   wherein said two openings which have said connecting element transverse axis as their center are arranged on opposite sides of said connecting element longitudinal axis and are separated from said connecting element longitudinal axis by half said module dimension M;
   wherein a first of said openings which have said connecting element longitudinal axis as their center is arranged on one side of said connecting element transverse axis at a distance from said connecting element transverse axis of half said module dimension M, and
   wherein a second of said openings which have said connecting element longitudinal axis as their center is arranged on a side of said connecting element transverse axis opposite said one side and at a distance from said connecting element transverse axis of half said module dimension M.

9. The switchgear assembly as claimed in claim 2, wherein said switch panel comprises an arrangement selected from the group consisting of a 1½-switch arrangement, a ring circuit, and a double-switch arrangement, and further comprising two busbar systems arranged above said at least one power breaker between said first connecting stub and said second connecting stub.

10. The switchgear assembly as claimed in claim 2, wherein said switchgear assembly is mounted on a foundation surface, and said first plane is parallel to said foundation surface.

11. The switchgear assembly as claimed in claim 1, wherein said switchgear assembly is mounted on a foundation surface, and said first plane is at right angles to said foundation surface.

12. The switchgear assembly as claimed in claim 2, wherein said switchgear assembly is mounted on a foundation surface, and said first plane is at right angles to said foundation surface.

13. The switchgear assembly as claimed in claim 2, wherein said distance between centers of said first connecting stub and said second connecting stub is 3.5 times said module dimension M.

14. The switchgear assembly as claimed in claim 2, wherein said power breakers each comprise a tank having a quenching chamber, and wherein said quenching chamber is removable from both ends of said tank.

15. The switchgear assembly as claimed in claim 2, wherein said connecting stubs each comprise top edges; and further comprising longitudinally stepped mounting elements for modularly constructing said switch panel from a top edge of said connecting stubs.

16. The switchgear assembly as claimed in claim 15, wherein said mounting elements comprise intermediate pieces having a length half said module dimension M;

wherein said mounting elements further comprise intermediate tubes whose length is equal to said module dimension M; and wherein said mounting elements further comprise connecting elements each having a longitudinal axis and a transverse axis at right angles to said connecting element longitudinal axis, which connecting elements have a length of 1.5 times said module dimension M along said longitudinal axis, and which connecting elements have a length equal to said module dimension M along said transverse axis.

17. The switchgear assembly as claimed in claim 16, wherein said connecting element comprises four flanged openings having the same diameter, two of said openings having as their center said connecting element transverse axis, and two other of said openings having as their center said connecting element longitudinal axis which forms an axis of symmetry;

wherein said two openings which have said connecting element transverse axis as their center are arranged on opposite sides of said connecting element longitudinal axis and are separated from said connecting element longitudinal axis by half said module dimension M;

wherein a first of said openings which have said connecting element longitudinal axis as their center is arranged on one side of said connecting element transverse axis at a distance from said connecting element transverse axis of half said module dimension M, and wherein a second of said openings which have said connecting element longitudinal axis as their center is arranged on a side of said connecting element transverse axis opposite said one side and at a distance from said connecting element transverse axis of half said module dimension M.

* * * * *